(12) United States Patent
Choy (10) Patent No.: US 7,279,959 B1
(45) Date of Patent: Oct. 9, 2007

(54) CHARGE PUMP SYSTEM WITH REDUCED RIPPLE AND METHOD THEREFOR

(75) Inventor: Jon S. Choy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 0 days.

(21) Appl. No.: 11/420,559

(22) Filed: May 26, 2006

(51) Int. Cl.
*G05F 1/10* (2006.01)
*G05F 3/02* (2006.01)

(52) U.S. Cl. ..................................... 327/536
(58) Field of Classification Search ............... 327/536; 363/59–60
See application file for complete search history.

(56) References Cited

U.S. PATENT DOCUMENTS

| | | | |
|---|---|---|---|
| 5,729,493 A | 3/1998 | Morton | |
| 5,999,009 A * | 12/1999 | Mitsui | ........................ 324/765 |
| 6,018,264 A | 1/2000 | Jin | |
| 6,642,774 B1 | 11/2003 | Li | |
| 6,836,176 B2 | 12/2004 | Zeng et al. | |
| 2004/0208026 A1* | 10/2004 | Kwon | ........................ 363/59 |

* cited by examiner

*Primary Examiner*—Quan Tra
(74) *Attorney, Agent, or Firm*—Joanna G. Chiu; Robert L. King (57) ABSTRACT

A charge pump system has a charge pump for receiving a clock signal and provides an output signal of increased voltage magnitude in response to an enable signal. A plurality of comparators is coupled to the charge pump for detecting when the output signal is greater than a reference value. Each of the plurality of comparators is controlled by a respective different control signal derived from the clock signal and has differing phases. Detection circuitry is coupled to the plurality of comparators for providing the enable signal in response to detecting first leading rising edges and first leading falling edges of signals provided by the plurality of comparators. The interleaving operation of the comparators results in tighter regulation of the charge pump which reduces voltage ripple without significantly increasing capacitive load on the charge pump.

20 Claims, 5 Drawing Sheets

CHARGE PUMP SYSTEM WITH REDUCED RIPPLE AND METHOD THEREFOR

FIELD OF THE INVENTION

The present invention relates generally to charge pump systems, and more particularly to a charge pump system with reduced ripple.

RELATED ART

Figure 1:
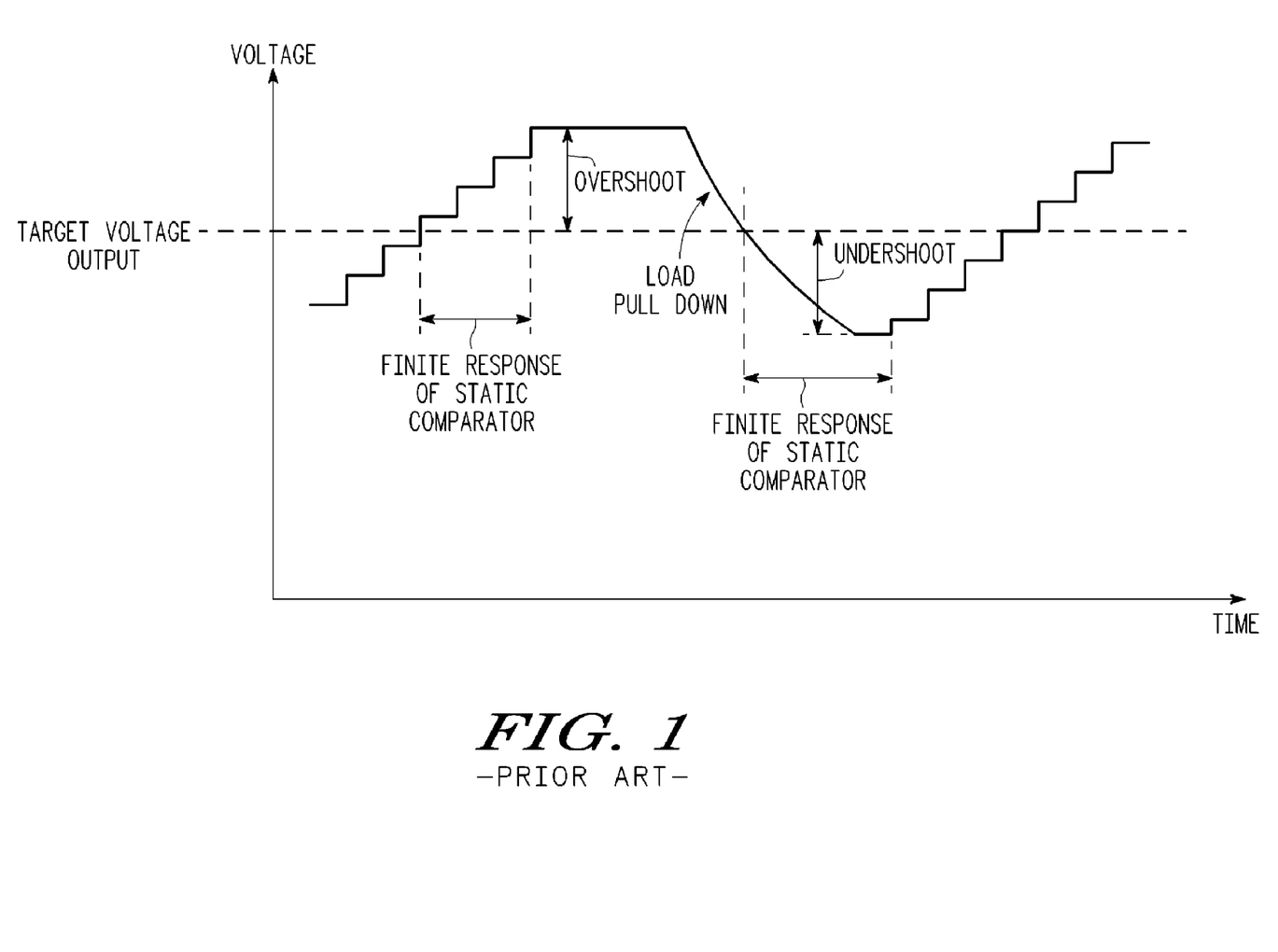
FIG. 1 illustrates, in timing diagram form, a charge pump output waveform in accordance with a prior art charge pump.

In circuit designs today, charge pumps may be used to deliver a desired voltage output to a particular load. The charge pump output is typically derived from a clock signal such that when the charge pump is enabled, the charge pump output discretely increases based on the clock pulse. For example, referring to FIG. 1, an example of a charge pump output is provided. The target voltage output on FIG. 1 refers to the desired voltage level that the charge pump is attempting to deliver. Note that the charge pump output increases in discrete steps (based on a clock signal received by the charge pump), until reaching the target voltage level, at which point the charge pump is disabled. In one charge pump system used today, a static comparator is used to determine when the charge pump output has reached the target voltage output. However, since the static comparator has a finite response time, the charge pump is not actually disabled until this finite amount of time after the charge pump output reaches the target voltage output. Once the charge pump is disabled, the static comparator continues to monitor the charge pump output to determine when the output falls below the target voltage output such that the charge pump can be again enabled. As illustrated in FIG. 1, the load coupled to the charge pump may begin pulling down the charge pump output, until it crosses below the target voltage output. Again, due to the finite response of the static comparator, the charge pump is not re-enabled until this finite amount of time after the output falls below the target voltage output. Therefore, the response of the static comparator results in an overshoot and undershoot of the target voltage output which the charge pump is attempting to provide. This overshoot and undershoot may be referred to as a ripple effect. It is typically desirable to reduce this ripple effect as much as possible, which may result in improved circuit operation.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The terms "assert" or "set" and "deassert" (or "negate" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. Therefore, each signal described herein may be designed as positive or negative logic, where negative logic can be indicated by "bar" or "b" following the signal name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, those signals described as positive logic signals may be implemented as negative logic signals, and those signals described as negative logic signals may be implemented as positive logic signals.

Figure 2:
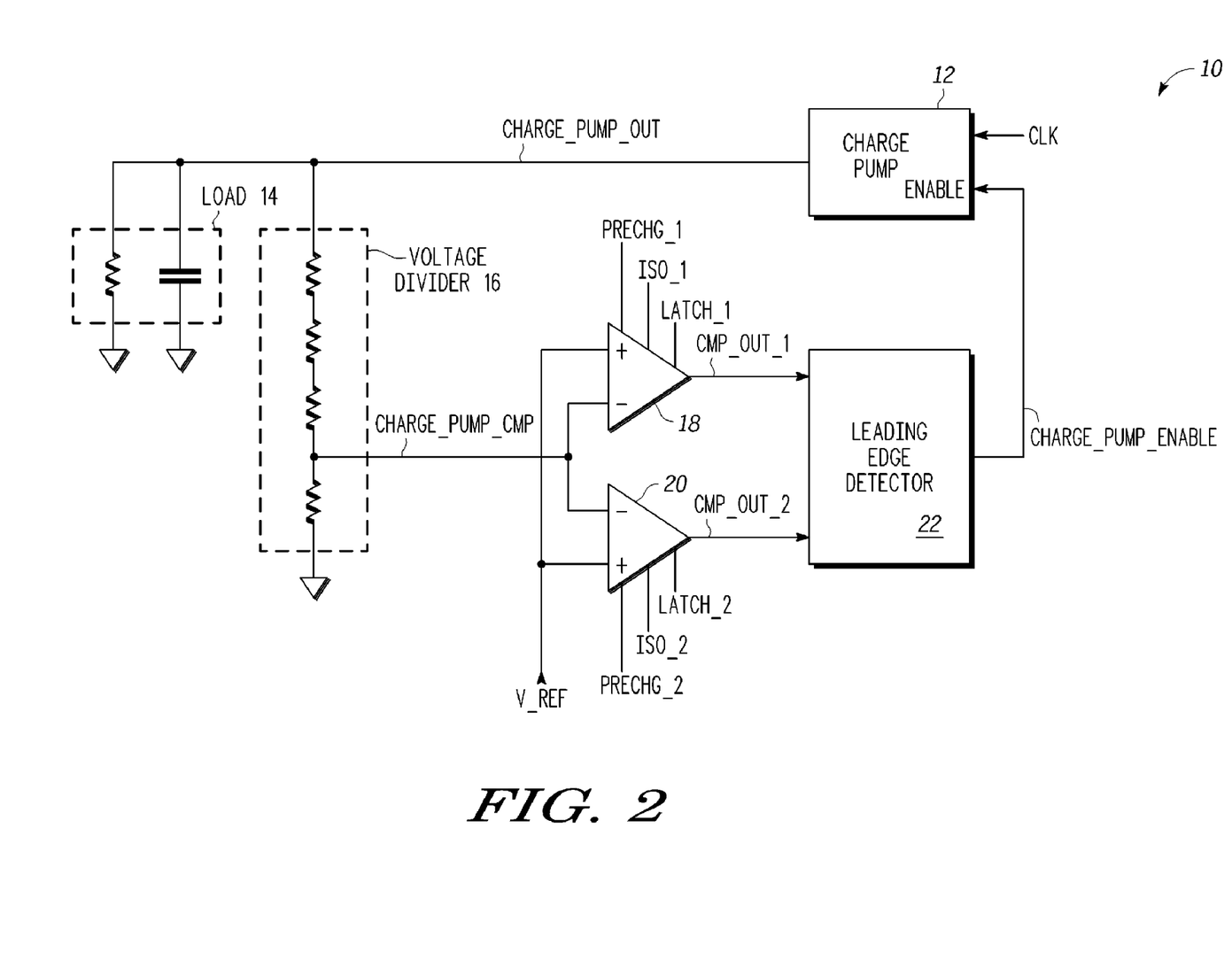
FIG. 2 illustrates, in block diagram form, a charge pump system in accordance with one embodiment of the present invention.

FIG. 2 illustrates, in block diagram form, a charge pump system 10 in accordance with one embodiment of the present invention. In the illustrated embodiment, charge pump system 10 includes a charge pump 12, a load 14, a voltage divider 16, latch comparators 18 and 20, and a leading edge detector 22. Charge pump 12 receives a clock signal CLK and provides charge_pump_out, where charge_pump_out is provided to load 14 and voltage divider 16. Charge pump 12 attempts to provide a desired voltage level, i.e. a target voltage level, via charge_pump_out. Note that charge pump 12 can be any type of charge pump. Load 14 in FIG. 2 is represented by a resistor and a capacitor connected in parallel. Load 14 can be any type of load which may, for example, be dynamically enabled. Voltage divider 16 receives charge_pump_out and provides a fraction of this voltage as charge_pump_cmp. In one embodiment, a plurality of series connected resistors are used to provide the voltage dividing. However, voltage divider 16 can be any type of voltage translation circuit used to reduce the voltage values provided by charge pump 12 for use by latch comparators 18 and 20. Charge_pump_cmp is provided to the negative inputs of each of latch comparators 18 and 20, where each of the positive inputs of latch comparators 18 and 20 receive a reference voltage v_ref. Note that, in one embodiment, since charge_pump_cmp is proportional to charge_pump_out, v_ref may be a voltage which is proportional to the target voltage to be output by charge pump 12. Latch comparator 18 receives a precharge signal, prechg_1, an isolation signal, iso_1, and a latch or clock signal, latch_1, and provides an output, cmp_out_1. Latch comparator 20 receives a precharge signal, prechg_2, an isolation signal, iso_2, and a latch or clock signal, latch_2, and provides an output, cmp_out_2. Cmp_out_1 and cmp_out_2 are provided to leading edge detector 22, which, in response to these signals, provides a charge_pump_enable signal to charge pump 12 to selectively enable charge pump 12. Signals prechg_1, iso_1, and latch_1 are out of phase with respect to prechg_2, iso_2, and latch_2, respectively, such that latch comparator 18 is out of phase with latch comparator 20.

In operation, charge pump 12 attempts to maintain charge_pump_out at a target voltage level, where charge_pump_out is derived from the clock, clk. In one embodiment, the clk signal itself is boosted to provide charge_pump_out. In one embodiment, charge_pump_out is boosted once with every clk cycle. In another embodiment, charge_pump_out is boosted with ever phase of clk, as will be seen below. Charge pump 12 may be enabled by charge_pump_enable until charge_pump_out reaches the target voltage level and may be disabled when charge_pump_out is above the target voltage level. The determination of whether charge_pump_out is above or below the target voltage level is made by comparing charge_pump_cmp (which is proportional to charge_pump_out) to v_ref (which is proportional to the target voltage). Through the use of out of phase latch comparators 18 and 20, multiple sample points are provided, thus improving the response time in detecting when charge_pump_cmp goes above or falls below v_ref. Leading edge detector 22, which receives out of phase compare outputs cmp_out_1 and cmp_out_2, provides charge_pump_enable in response to successively and alternately detecting first leading rising edges and first leading falling edges of cmp_out_1 and cmp_out_2. Operation of latch comparators 18 and 20 and leading edge detector 22 will be described in more detail in reference to FIGS. 3-5.

Figure 3:
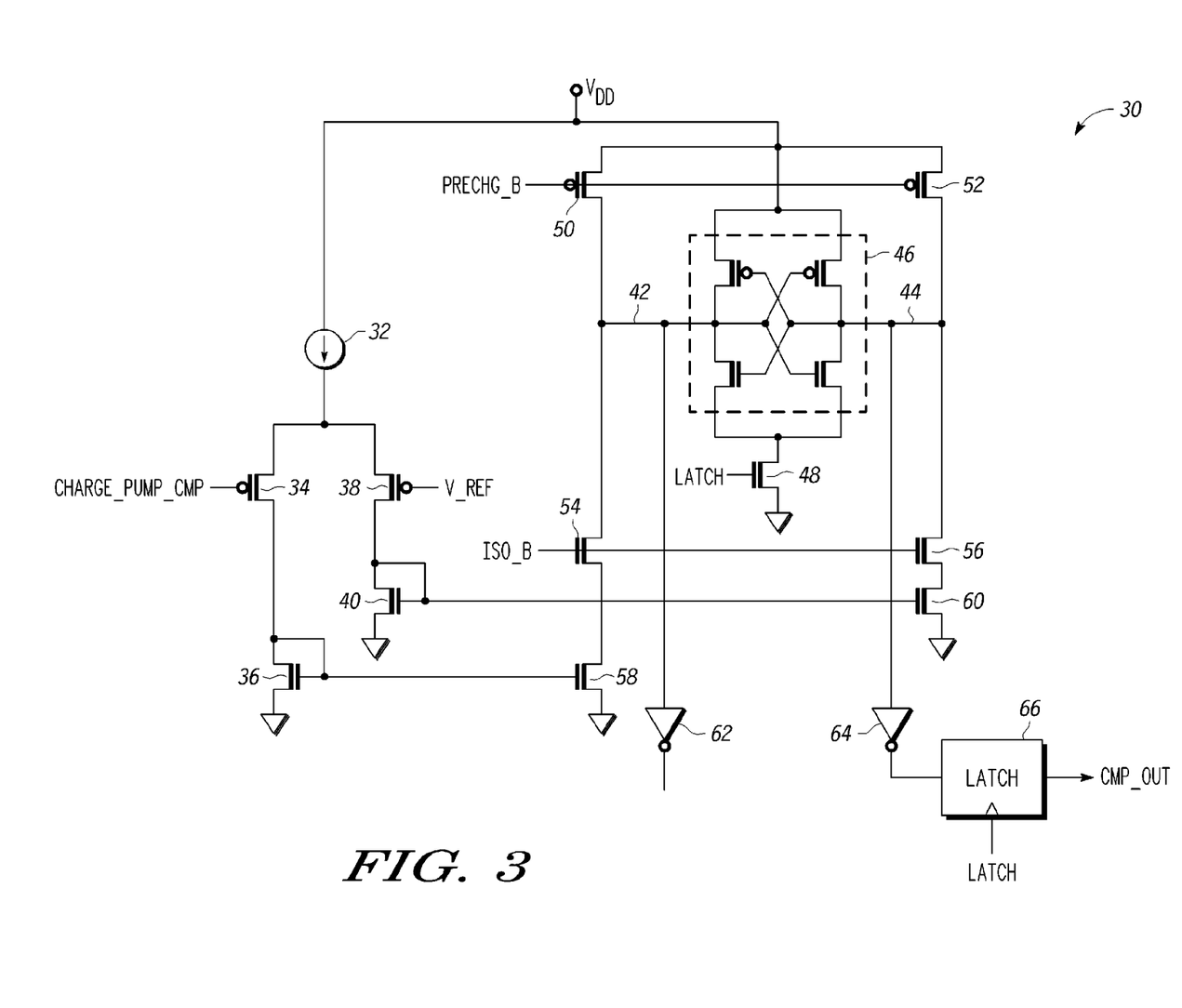
FIG. 3 illustrates, in schematic form, a latch comparator suitable for use in the charge pump system of FIG. 2 in accordance with one embodiment of the present invention.
Figure 4:
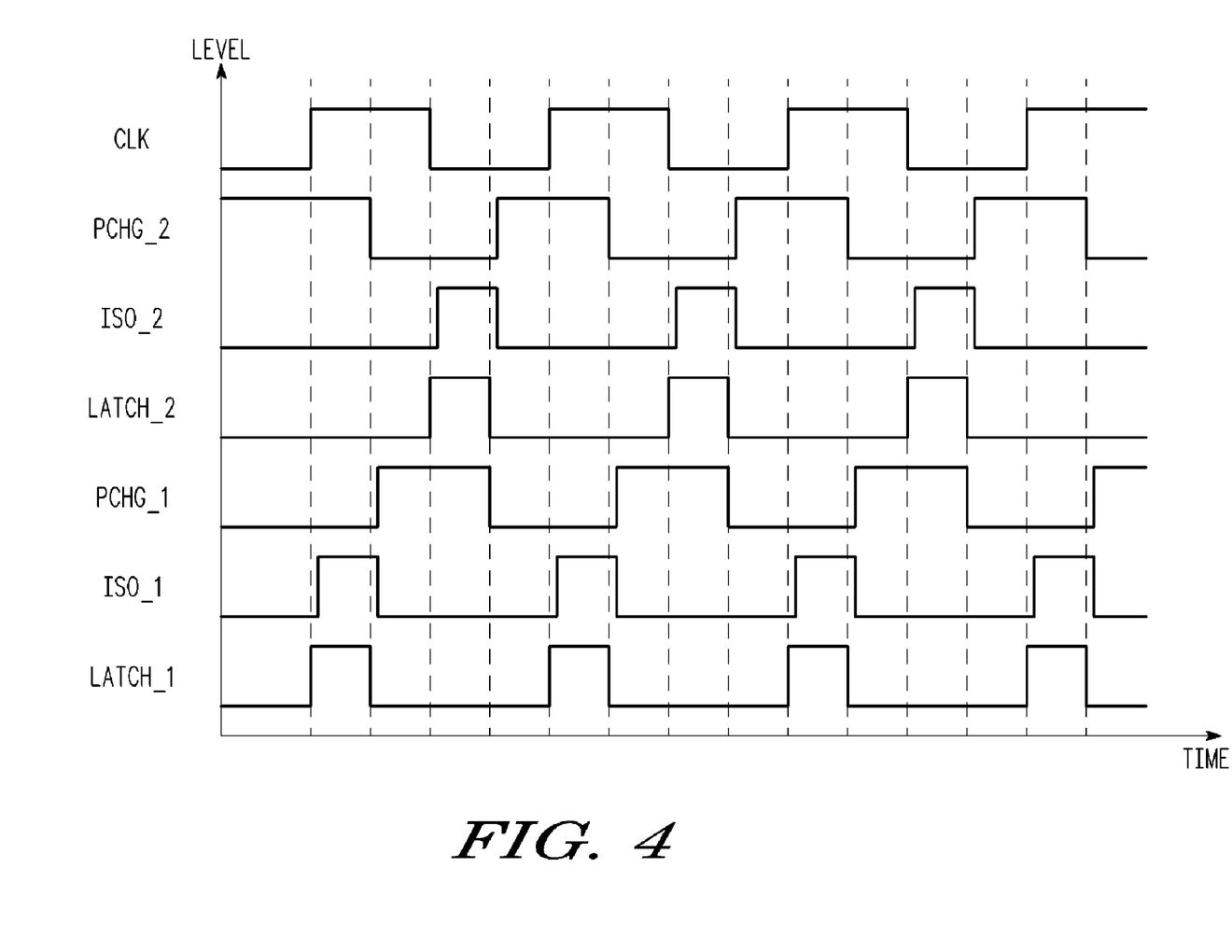
FIGS. 4 and 5 illustrate a timing diagram for various signals present in FIG. 2 in accordance with one embodiment of the present invention.

FIG. 3 illustrates a latch comparator 30 which may be used for each of latch comparators 18 and 20 of FIG. 2. Latch comparator 30 includes a current source 32 having a first terminal coupled to VDD. Latch comparator 30 includes a p-channel transistor 34 having a first current electrode coupled to a second terminal of current source 32 and a p-channel transistor 38 having a first current electrode coupled to the second terminal of current source 32. A control electrode of transistor 34 receives charge_pump_cmp and a control electrode of transistor 38 receives v_ref. Latch comparator 30 includes an n-channel transistor 36 having a first current electrode coupled to a second current electrode of transistor 34 and coupled to a control electrode of transistor 36. A second current electrode of transistor 36 is coupled to ground. Latch comparator 30 includes an n-channel transistor 40 having a first current electrode coupled to a second current electrode of transistor 38 and coupled to a control electrode of transistor 40. A second current electrode of transistor 40 is coupled to ground.

Latch comparator 30 also includes p-channel transistors 50 and 52, n-channel transistors 48, 54, 56, 58, and 60, cross coupled latch 46, inverters 62 and 64, and latch 66. A first current electrode of each of transistors 50 and 52 is coupled to VDD, and a control electrode of each of transistors 50 and 52 is coupled to receive a precharge signal, prechg_b. A second current electrode of transistor 50 is coupled to node 42, and a second current electrode of transistor 52 is coupled to node 44. Cross coupled latch 46 is coupled between nodes 42 and 44, and to a first current electrode of transistor 48. A control electrode of transistor 48 is coupled to receive a latch signal, and a second current electrode of transistor 48 is coupled to ground. A first current electrode of transistor 54 is coupled to node 42, and a first current electrode of transistor 56 is coupled to node 44. A control electrode of each of transistors 54 and 56 is coupled to receive an isolation signal, iso_b. A first current electrode of transistor 58 is coupled to a second current electrode of transistor 54, a control electrode of transistor 58 is coupled to the control electrode of transistor 36, and a second current electrode of transistor 58 is coupled to ground. A first current electrode of transistor 60 is coupled to a second current electrode of transistor 56, a control electrode of transistor 60 is coupled to the control electrode of transistor 40, and a second current electrode of transistor 60 is coupled to ground. Node 42 is coupled to an input of inverter 62. Node 44 is coupled to an input of inverter 64. An output of inverter 64 is coupled to an input of latch 66. Latch 66 also receives a latch input, latch, and provides an output, cmp_out.

Note that latch comparator 30 can be used for each of latch comparators 18 and 20. Therefore, note that prechg_b, iso_b, latch, and cmp_out of latch comparator 30 could correspond to prechg_1_b, iso_1_b, latch_1, and cmp_out_1 of latch comparator 18, respectively, or to prechg_2_b, iso_2_b, latch_2, and cmp_out_2 of latch comparator 20, respectively. Note that the "_b" following the signal name indicates the logical inverse of the signal. For ease of explanation, operation of latch comparator 30 will be described in reference to FIG. 4 and signals pchg_2, iso_2, and latch_2 of latch comparator 20.

In operation, latch comparator 30 provides an output, cmp_out, which indicates whether v_ref is greater than or less than charge_pump_cmp. In the illustrated embodiment, cmp_out is a logic level 0 when charge_pump_cmp is greater than v_ref and a logic level 1 when charge_pump_cmp is less than v_ref. For example, the voltage of charge_pump_cmp at the control electrode of transistor 34 provides a current through transistor 36, which is provided as a voltage to the control electrode of transistor 58, which is provided as a current through transistor 54, which results in a voltage at node 42. Similarly, the voltage of v_ref at the control electrode of transistor 38 provides a current through transistor 40, which is provided as a voltage to the control electrode of transistor 60, which is provided as a current through transistor 56, which results in a voltage at node 44. Therefore, initially, nodes 42 and 44 are precharged to VDD while prechg_2 is a logic level one (where prechg_b of FIG. 3 would therefore be a logic level 0, thus turning on transistors 50 and 52). At some point after precharging is complete, the isolation signal, iso_2, is asserted. This results in iso_b being a logic level 0 which turns off transistors 54 and 56. Also at this point, the latch signal, latch_2, is asserted which results in the turning on of transistor 48. Therefore, while iso_2 and latch_2 are asserted, nodes 42 and 44 are being affected by the charge_pump_cmp and v_ref signals. Depending on which voltage (the voltage at node 42 resulting from charge_pump_cmp or the voltage at node 44 resulting from v_ref) reaches a level of approximately VDD-VTP (with VTP being the threshold voltage of transistors within cross coupled latch 46) first, the opposite node gets pulled up to VDD, eventually causing the "winning" node (i.e. the node which first reached approximately VDD-VTP) to start approaching zero.

For example, assuming charge_pump_cmp is greater than v_ref, then node 44 would "win" by reaching VDD-VTP first. In this case, node 42 gets pulled up to VDD, while node 42 continues to fall to zero. Therefore, the output of inverter 64 would be a logic level one if charge_pump_cmp is greater than v_ref. In one embodiment, latch 66 includes an inverter such that cmp_out would be a logic level 0 when charge_pump_cmp is greater than v_ref. Similarly, if v_ref is greater than charge_pump_cmp, cmp_out would be a logic level 1. As will be described in reference to FIG. 5, cmp_out (which may correspond to cmp_out_1 or cmp_out_2) is then used to generate charge_pump_enable.

As described above, note that latch comparator 30 can be used for each of latch comparator 18 and latch comparator 20. Therefore, operation of latch comparator 30 would operate in a same manner in response to prechg_1, iso_1, and latch_1 as in response to prechg_2, iso_2, and latch_2, respectively, as described above. However, as seen in reference to FIG. 4, note that prechg_2, iso_2, and latch_2 are out of phase with respect to prechg_1, iso_1, and latch_1, respectively. For example, prechg_2 is asserted during the low phase of clk while prechg_1 is asserted during the high phase of clk. Also, note that latch_1 is asserted on the rising edge of clk, while latch_2 is asserted on the falling edge of clk. (Note that latch_1 and latch_2 may be referred to as clock signals which are derived from the clock signal used by charge pump 12, e.g., clk. Also, note that in one embodiment, each of latch_1 and latch_2 are pulsed once within a predetermined number of one or more cycles of clk, but at different points in time due to their phase difference.) Similarly, iso_1 is asserted shortly after the rising edge of clk, while iso_2 is asserted shortly after the falling edge of clk. In this manner, the respective outputs of latch comparators 18 and 20, cmp_out_1 and cmp_out_2, are out of phase with each other, which, as will be described in reference to FIG. 5, allow for an increased number of sampling points which may allow for improved control of charge pump 12. In one embodiment, latch comparator 20 is 180 degrees out of phase with latch comparator 18, such that, for example, latch_2 is 180 degrees out of phase with latch_1.

Figure 5:
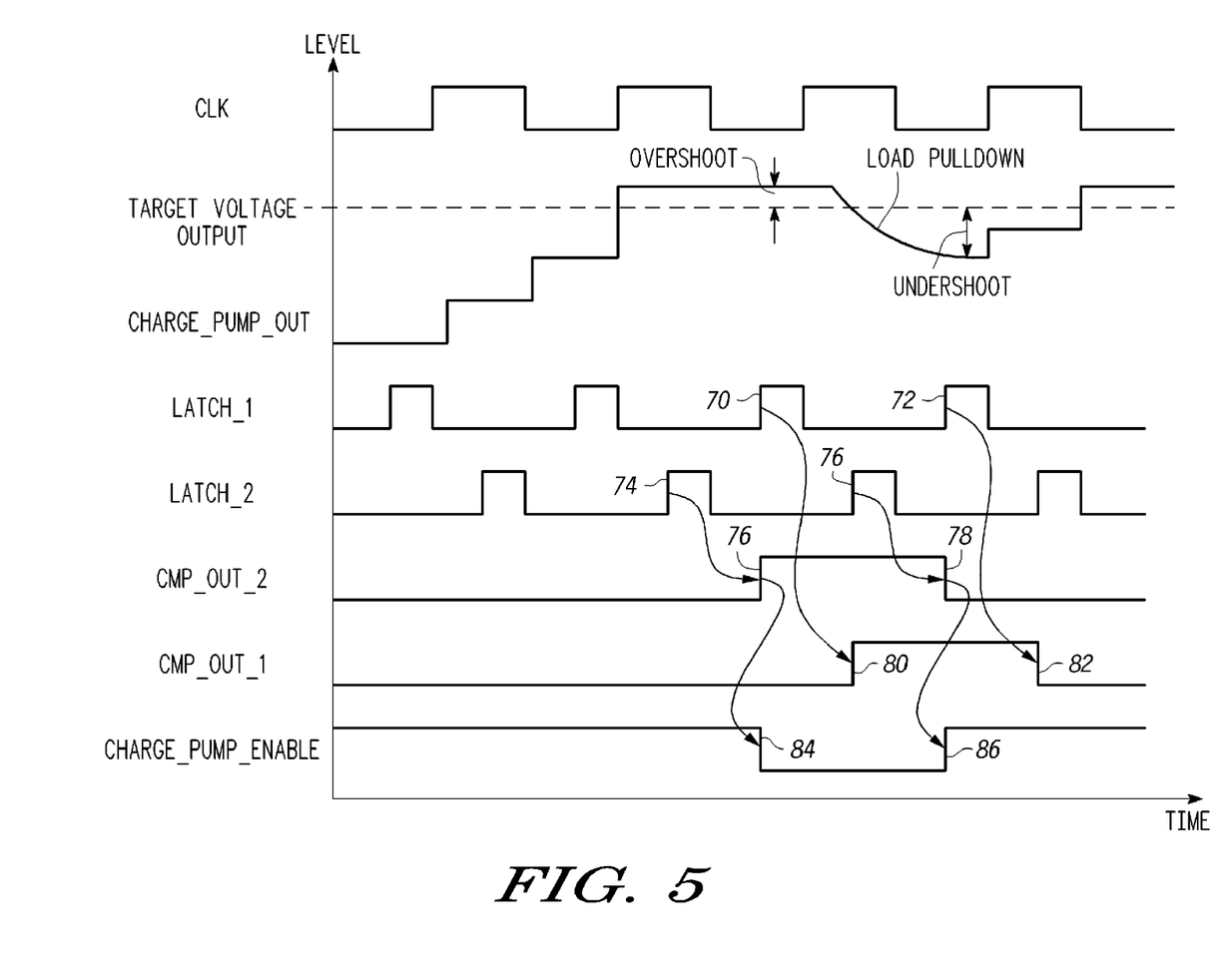

FIG. 5 illustrates a timing diagram to better describe operation of charge pump system 10. As described above in reference to FIGS. 3 and 4, note that latch_1 and latch_2 of latch comparators 18 and 20, respectively, are out of phase with each other and provide multiple sample points for determining when charge_pump_out reaches the target voltage. For example, as seen in FIG. 5, charge pump 12 is initially enabled via assertion of charge_pump_enable. Charge_pump_out, as was described above, increases in discrete steps with the clock, clk. Note that in the illustrated embodiment, charge_pump_out increases with each phase of the clock (during both the high phase and low phase); however, in alternate embodiments using other types of charge pumps, charge_pump_out may only increase with each full cycle of the clock. Therefore, note that any known type of charge pump may be used. Charge_pump_out continues to increase until it reaches the target voltage. The first latch comparator to detect this is latch comparator 20 since assertion of latch_2 results in cmp_out_2 being asserted to indicate that the charge_pump_out is greater than the target voltage (or, as described in reference to FIG. 3, that charge_pump_cmp, which is proportional to charge_pump_out, is greater than v_ref. which is proportional to the target voltage). Therefore, as indicated in FIG. 5, edge 76 follows from edge 74. Assertion of latch_1 results in edge 70 which then results in edge 80. That is, at some point after, the output of latch comparator 18, cmp_out_1, is also asserted to indicate that charge_pump_out is greater than the target voltage. In this manner, both latch comparators provide an indication that charge_pump_out has been boosted above the target voltage, but at different points in time due to the phase difference between them. Leading edge detector 22 therefore uses the leading edge (the leading rising edge, in the current example), to generate charge_pump_enable. In the example of FIG. 5, leading edge detector 22 uses edge 76 from latch comparator 20, which leads edge 80 from latch comparator 18, to generate edge 84 of charge_pump_enable.

Therefore, in response to cmp_out_2, charge_pump_enable gets negated in order to disable charge pump 12. In this manner, charge_pump_out no longer gets boosted. Also, note that if a pulse of latch_1 had been the first to occur after charge_pump_out had risen above the target voltage, then latch comparator 18 would have been the first to detect that charge_pump_out had reached the target voltage, and leading edge comparator 22 would have deasserted charge_pump_enable in response to assertion of cmp_out_1 rather than cmp_out_2.

Note that operation of load 14 may eventually cause load pulldown of charge_pump_out, as illustrated in FIG. 5. At this point, charge_pump_out begins to decrease until eventually falling below the target voltage. The first latch pulse which occurs after charge_pump_out falls below the target voltage is latch_2. Therefore, edge 76 of latch_2 results in edge 78 of cmp_out_2 where cmp_out_2 is deasserted to indicate that charge_pump_out is less then the target voltage. Again, latch_1, being out of phase with latch_2, detects the fall of charge_pump_out below the target voltage at some time later, where edge 72 results in edge 82 (where cmp_out_1 is deasserted). However, leading edge detector detects the leading edge (leading falling edge at this point, since a leading rising edge was previously detected), and uses this leading falling edge, edge 78, to assert charge_pump_enable in order to re-enable charge pump 12. Therefore, edge 86 results from edge 78. However, note that if latch_1 had been the first latch pulse after charge_pump_out fell below the target voltage, then cmp_out_1 would have produced the leading falling edge, and edge 86 would have been generated from the falling edge of cmp_out_1 rather than cmp_out_2.

Therefore, note that leading edge detector 22 successively and alternately detects first occurring same-type edges of the outputs of latch comparators 18 and 20 (of cmp_out_1 and cmp_out_2). That is, leading edge detector 22 may first detect a leading rising edge, as in FIG. 5, followed by detecting a leading falling edge. However, if, in the example of FIG. 5, charge_pump_out had started above the target output voltage, leading edge detector 22 would first detect leading falling edges and then leading rising edges. Furthermore, note that the signals can be implemented using either positive or negative logic. For example, in an alternate embodiment, negation, rather than assertion, of the outputs cmp_out_1 and cmp_out_2 of latch comparators 18 and 20 can indicate that charge_pump_out is greater than the target voltage. In this case, upon charge_pump_out increasing above the target voltage, leading edge detector 22 would detect a first falling edge. Therefore, note that the signals of charge pump system 10 can be implemented in many different ways, where leading edge detector 22 can successively and alternately detect first occurring same-type edges in order to generate a signal, such as charge_pump_enable, to enable and disable charge pump 12 as needed.

Note that there is still some response time between latch comparator 20 detecting that charge_pump_out has reached the target voltage and disabling charge pump 12, resulting in an overshoot. Similarly, there is also some response time between latch comparator 20 detecting that charge_pump_out has fallen below the target voltage and enabling charge pump 12, resulting in an undershoot. However, note that this overshoot and undershoot is less than what was previously achievable through the use of static comparators. Also, note that through the use of two out of phase latch comparators, such as latch comparators 18 and 20, system 10 can more quickly detect when charge_pump_out goes above or below the target voltage. That is, the use of out of phase latch pulses (such as the pulses of latch_1 and latch_2 in FIG. 5) allows for an increase in sampling points to more quickly detect when the target voltage is reached.

Also, in alternate embodiments, any number of comparators may be used to detect when charge_pump_cmp is greater than a reference voltage such as v_ref, each of these comparators being controlled by a respective different control signal, such as a latch signal, derived from clk and having differing phases. Leading edge detector 22 would then detect first leading rising edges and first leading falling edges from the outputs provided by the comparators. In one embodiment, only one output of the plurality of comparators is used by the detection circuitry to provide an enable signal for charge pump 12 in response to any time the plurality of comparators detect when charge_pump_cmp is greater than the reference voltage. Also, each of these comparators can be a same type of comparator having substantially a same circuit schematic. For example, they can each be a latch comparator such as the one illustrated in FIG. 3.

In one embodiment, a charge pump system includes a charge pump having an input for receiving a first clock signal to be boosted in voltage to a target voltage; a first latch comparator having a first input coupled to the charge pump, a second input coupled to a reference voltage terminal, an output, and a clock input for receiving a second clock signal having a first phase; a second latch comparator having a first input coupled to the charge pump, a second input coupled to the reference voltage terminal, an output, and a clock input for receiving a third clock signal having a second phase that differs from the first phase; and a leading edge detector coupled to both the output of the first latch comparator and the output of the second latch comparator, the leading edge detector providing an enable signal to the charge pump in response to successively and alternately detecting first occurring same-type edges of the outputs of the first latch comparator and the second latch comparator.

In a further embodiment, the charge pump system further includes a voltage translation circuit coupled between the output of the charge pump and the first input of each of the first latch comparator and the second latch comparator, the voltage translation circuit reducing voltage values provided by the charge pump for use by the first latch comparator and the second latch comparator.

In another further embodiment, the charge pump system further includes a load coupled to the charge pump.

In another further embodiment, the second clock signal and the third clock signal are derived from the first clock signal and phase shifted by approximately one hundred eighty degrees.

In another further embodiment, the first latch comparator and the second latch comparator each begin to provide an indication that an output of the charge pump has been boosted above the target voltage at differing times due to phase difference between the first phase and the second phase.

In another further embodiment, the first latch comparator and the second latch comparator are each clocked once within a predetermined number of one or more cycles of the first clock signal but at different points in time due to the second phase differing from the first phase.

In another further embodiment, a first occurring one of the second clock signal or the third clock signal after detection of an overshoot of the charge pump above the target voltage causes one of the first latch comparator or the second latch comparator to change its output first.

In another embodiment, a method includes providing a charge pump having an input for receiving a first clock signal to be boosted in voltage to a target voltage; coupling a first input of a first latch comparator to the charge pump, coupling a second input thereof to a reference voltage terminal, providing an output of the first latch comparator, and providing a clock input for receiving a second clock signal having a first phase; coupling a first input of a second latch comparator to the charge pump, coupling a second input thereof to the reference voltage terminal, providing an output of the second latch comparator, and providing a clock input for receiving a third clock signal having a second phase that differs from the first phase; and coupling a leading edge detector to both the output of the first latch comparator and the output of the second latch comparator, the leading edge detector providing an enable signal to the charge pump in response to successively and alternately detecting first occurring same-type edges of the outputs of the first latch comparator and the second latch comparator.

In a further embodiment, the method further includes coupling a voltage translation circuit between the output of the charge pump and the first input of each of the first latch comparator and the second latch comparator, the voltage translation circuit reducing voltage values provided by the charge pump for use by the first latch comparator and the second latch comparator.

In a further embodiment, the method further includes coupling a load to the charge pump.

In a further embodiment, the method further includes deriving the second clock signal and the third clock signal from the first clock signal, and phase shifting the second clock signal approximately one hundred eighty degrees from the third clock signal.

In a further embodiment, the method further includes using the first latch comparator and the second latch comparator to separately provide an indication that the first clock signal has been boosted above the target voltage, and at differing times due to phase difference between the first phase and the second phase.

In a further embodiment, the method further includes clocking each of the first latch comparator and the second latch comparator once within a predetermined number of one or more cycles of the first clock signal but at different points in time due to the second phase differing from the first phase.

In a further embodiment, the method further includes causing either the first latch comparator or the second latch comparator to change its output first in response to detecting an overshoot of the charge pump above the target voltage based upon a first occurring one of the second clock signal and the third clock signal after detecting the overshoot.

In another embodiment, a charge pump system includes a charge pump for receiving a clock signal and providing an output signal of increased voltage magnitude in response to an enable signal; a plurality of comparators coupled to the charge pump for detecting when the output signal is greater than a reference value, each of the plurality of comparators being controlled by a respective different control signal derived from the clock signal and having differing phases; and detection circuitry coupled to the plurality of comparators, the detection circuitry providing the enable signal in response to detecting first leading rising edges and first leading falling edges of signals provided by the plurality of comparators.

In a further embodiment, the charge pump further includes a voltage translation circuit coupled between the charge pump and each of the plurality of comparators, the voltage translation circuit reducing a voltage magnitude of the output signal prior to the plurality of comparators receiving the output signal.

In a further embodiment, only one output of the plurality of comparators is used by the detection circuitry to provide the enable signal in response to any time the plurality of comparators detect when the output signal is greater than the reference value.

In a further embodiment, each of the plurality of comparators is clocked once within one or more predetermined cycles of the clock signal.

In a further embodiment, each of the plurality of comparators is implemented with a same type of comparator having substantially a same circuit schematic.

In a further embodiment, the detection circuitry further comprises a circuit that provides an enable signal to the charge pump in response to successively and alternately detecting first leading rising edges and first leading falling edges of outputs of the plurality of comparators.

Although the invention has been described with respect to specific conductivity types or polarity of potentials, skilled artisans appreciated that conductivity types and polarities of potentials may be reversed.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. Note that the term "couple" has been used to denote that one or more additional conductive elements may be interposed between two elements that are coupled.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A charge pump system, comprising:
    a charge pump having an input for receiving a first clock signal to be boosted in voltage to a target voltage;
    a first latch comparator having a first input coupled to the charge pump, a second input coupled to a reference voltage terminal, an output, and a clock input for receiving a second clock signal having a first phase;
    a second latch comparator having a first input coupled to the charge pump, a second input coupled to the reference voltage terminal, an output, and a clock input for receiving a third clock signal having a second phase that differs from the first phase; and
    a leading edge detector coupled to both the output of the first latch comparator and the output of the second latch comparator, the leading edge detector providing an enable signal to the charge pump in response to successively and alternately detecting first occurring same-type edges of the outputs of the first latch comparator and the second latch comparator.

2. The charge pump system of claim 1 further comprising:
    a voltage translation circuit coupled between the output of the charge pump and the first input of each of the first latch comparator and the second latch comparator, the voltage translation circuit reducing voltage values provided by the charge pump for use by the first latch comparator and the second latch comparator.

3. The charge pump system of claim 1 further comprising a load coupled to the charge pump.

4. The charge pump system of claim 1 wherein the second clock signal and the third clock signal are derived from the first clock signal and phase shifted by approximately one hundred eighty degrees.

5. The charge pump system of claim 1 wherein the first latch comparator and the second latch comparator each begin to provide an indication that an output of the charge pump has been boosted above the target voltage at differing times due to phase difference between the first phase and the second phase.

6. The charge pump system of claim 1 wherein the first latch comparator and the second latch comparator are each clocked once within a predetermined number of one or more cycles of the first clock signal but at different points in time due to the second phase differing from the first phase.

7. The charge pump system of claim 1 wherein a first occurring one of the second clock signal or the third clock signal after detection of an overshoot of the charge pump above the target voltage causes one of the first latch comparator or the second latch comparator to change its output first.

8. A method, comprising:
    providing a charge pump having an input for receiving a first clock signal to be boosted in voltage to a target voltage;
    coupling a first input of a first latch comparator to the charge pump, coupling a second input thereof to a reference voltage terminal, providing an output of the first latch comparator, and providing a clock input for receiving a second clock signal having a first phase;
    coupling a first input of a second latch comparator to the charge pump, coupling a second input thereof to the reference voltage terminal, providing an output of the second latch comparator, and providing a clock input for receiving a third clock signal having a second phase that differs from the first phase; and
    coupling a leading edge detector to both the output of the first latch comparator and the output of the second latch comparator, the leading edge detector providing an enable signal to the charge pump in response to successively and alternately detecting first occurring same-type edges of the outputs of the first latch comparator and the second latch comparator.

9. The method of claim 8 further comprising:
    coupling a voltage translation circuit between the output of the charge pump and the first input of each of the first latch comparator and the second latch comparator, the voltage translation circuit reducing voltage values provided by the charge pump for use by the first latch comparator and the second latch comparator.

10. The method of claim 8 further comprising coupling a load to the charge pump.

11. The method of claim 8 further comprising:
    deriving the second clock signal and the third clock signal from the first clock signal; and
    phase shifting the second clock signal approximately one hundred eighty degrees from the third clock signal.

12. The method of claim 8 further comprising:
    using the first latch comparator and the second latch comparator to separately provide an indication that the first clock signal has been boosted above the target voltage, and at differing times due to phase difference between the first phase and the second phase.

13. The method of claim 8 further comprising:
clocking each of the first latch comparator and the second latch comparator once within a predetermined number of one or more cycles of the first clock signal but at different points in time due to the second phase differing from the first phase.

14. The method of claim 8 further comprising:
causing either the first latch comparator or the second latch comparator to change its output first in response to detecting an overshoot of the charge pump above the target voltage based upon a first occurring one of the second clock signal and the third clock signal after detecting the overshoot.

15. A charge pump system comprising:
a charge pump for receiving a clock signal and providing an output signal of increased voltage magnitude in response to an enable signal;
a plurality of comparators coupled to the charge pump for detecting when the output signal is greater than a reference value, each of the plurality of comparators being controlled by a respective different control signal derived from the clock signal and having differing phases; and
detection circuitry coupled to the plurality of comparators, the detection circuitry providing the enable signal in response to detecting first leading rising edges and first leading falling edges of signals provided by the plurality of comparators.

16. The charge pump system of claim 15 further comprising:
a voltage translation circuit coupled between the charge pump and each of the plurality of comparators, the voltage translation circuit reducing a voltage magnitude of the output signal prior to the plurality of comparators receiving the output signal.

17. The charge pump system of claim 15 wherein only one output of the plurality of comparators is used by the detection circuitry to provide the enable signal in response to any time the plurality of comparators detect when the output signal is greater than the reference value.

18. The charge pump system of claim 15 wherein each of the plurality of comparators is clocked once within one or more predetermined cycles of the clock signal.

19. The charge pump system of claim 15 wherein each of the plurality of comparators is implemented with a same type of comparator having substantially a same circuit schematic.

20. The charge pump system of claim 15 wherein the detection circuitry further comprises a circuit that provides an enable signal to the charge pump in response to successively and alternately detecting first leading rising edges and first leading falling edges of outputs of the plurality of comparators.

* * * * *